United States Patent
Mahlein

[11] 3,804,487
[45] Apr. 16, 1974

[54] OPTICAL INPUT COUPLER FOR A LIGHT GUIDE

[75] Inventor: Hans Mahlein, Munich, Germany

[73] Assignee: Siemens AG, Berlin and Munich, Germany

[22] Filed: Feb. 1, 1973

[21] Appl. No.: 328,764

[30] Foreign Application Priority Data
Feb. 7, 1972 Germany.......................... 2205625

[52] U.S. Cl. ........................... 350/96 WG, 350/286
[51] Int. Cl. ............................................. G02b 5/14
[58] Field of Search ............................... 350/96 WG

[56] References Cited
UNITED STATES PATENTS
3,387,909  6/1968  Anderson et al............. 350/96 WG
3,610,727  10/1971  Ulrich ........................... 350/96 WG Primary Examiner—John K. Corbin
Attorney, Agent, or Firm—Hill, Sherman, Meroni, Gross & Simpson

[57] ABSTRACT

An optical input coupler for introducing light into a light guide that is formed as a dielectric guide layer arranged on a first surface of a transparent carrier member characterized by a first dielectric input layer of highly refractive material relative to the material of the carrier member disposed on the surface of the carrier member adjacent the end of the dielectric light guide layer to form a first boundary surface, a second dielectric input layer of low refractive material relative to the carrier member disposed on the first input layer to provide a second boundary surface, and the carrier member has a second surface inclined at an angle of the first surface so that when a light is projected on the second surface normal to the second surface the light is subjected to refraction at the first boundary surface to produce refracted light which strikes the second boundary surface at the critical angle of total reflection and the light is coupled into the dielectric guide layer. Preferably, the second surface is coated with an anti-reflection material and the first input layer as well as the dielectric light guide layer are zinc sulphide while the second input layer is magnesium fluoride.

8 Claims, 1 Drawing Figure

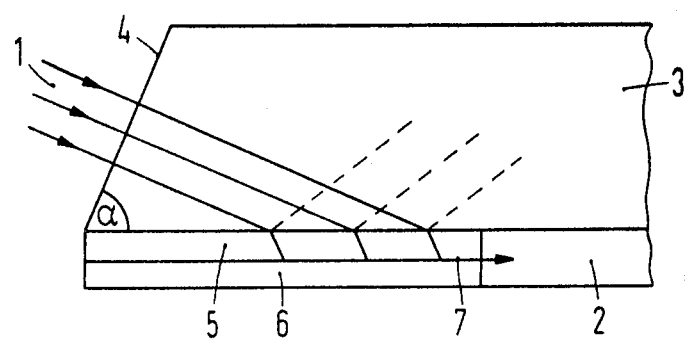

OPTICAL INPUT COUPLER FOR A LIGHT GUIDE

BACKGROUND OF THE INVENTION

1. Field of the Invention:

The present invention is directed to an optical input coupler for introducing light into a light guide which comprises a dielectric layer arranged on a transparent carrier member or substrate.

2. Prior Art:

In order to conduct light signals along a given path over distances of several kilometers utilizing a light guide, a light signal transmitted from a light source must be coupled into the light guide with the least possible losses. Light conductors generally have a thickness in the order of magnitude of a few microns. An incident light ray is normally coupled into the light guide by a light coupler having a surface with an area adapted to match or exceed the cross-sectional area of the light ray. A conventional coupler is a so-called prism-film input coupler which is generally employed for coupling the light signals into a light guide which is formed by a dielectric layer on a carrier member or substrate. These couplers comprise a glass prism which is placed at an end of the light guide with its base spaced from the surface of the light guide by an air gap having a width of one-eighth to one-fourth of the wavelength of the light being utilized as measured in a vacuum. Such an air gap is necessary in order to achieve a maximum input coupling efficiency. The light rays to be injected into the light guide are refracted by a lateral surface of the prism towards the prism base at which it undergoes a total internal reflection. A wave field is produced at the base and continues through the air gap into the wave guide layer. The operation and the use of this type of coupling device is discussed in an article by P.K. Tien, entitled "Light Waves In Thin Films And Integrated Optics," Applied Optics, Vol. 10, No. 11, November 1971, pages 2,395–2,413.

In the above type of input couplers using a prism, the coupling efficiency rapidly decreases in the event of any deviation in the width of the air gap from the above-mentioned values. Thus, the positioning of the base of the prism with respect to the dielectric guide layer must be made as accurately as possible and must be accurately maintained during operation of the device. Due to this critical spacing, the coupling devices utilizing a prism are difficult to produce and require a long manufacturing time resulting in this type of device being expensive to produce. Furthermore, since the air gap width may not remain constant, the operational life of the coupler is often limited.

SUMMARY OF THE INVENTION

The present invention is directed to an optical input coupler that is simple to manufacture and is capable of reliable operation for a long time. The optical input coupler of the present invention introduces light into a light guide that is in the form of a dielectric guide layer arranged or disposed on a first surface of a transparent carrier member or substrate. The input coupler comprises a first dielectric input layer of a highly refractive material relative to the material of the carrier member disposed on the first surface of the carrier member adjacent an end of the dielectric light guide layer to form a first boundary surface between the carrier member and the first layer, a second dielectric input layer of low-refractive material relative to the first input layer disposed on the first input layer to provide a second boundary surface between the first and second input layers and the carrier member having a second surface inclined at an angle to the first surface so that when a light is projected on the second surface normal to the light is subjected to refraction at the second surface to produce a refracted light at the first boundary surface which strikes the second boundary surface at the critical angle of total reflection and is coupled into the dielectric guide layer. Preferably, the first surface of the carrier member is flat and the thickness of the first dielectric input layer is less than the thickness of the dielectric light guide layer.

BRIEF DESCRIPTION OF THE FIGURE

The FIGURE is a schematic illustration of a sectional diagram through an exemplary embodiment of an optical input guide constructed in accordance with the invention.

DESCRIPTION OF THE PREFERRED EMBODIMENT

The principles of the present invention are particularly useful when incorporated in a coupler illustrated in the FIGURE for coupling a beam of light 1 into a dielectric light guide layer 2. The dielectric light guide layer 2, which may be formed of a layer of zinc sulphide, is disposed or arranged on a first surface, which is preferably flat, of a transparent carrier member or substrate 3 which consists of a glass having an index of refraction, $n = 1.5$. The carrier member 3 has a second surface or face 4 upon which the light beams 1 such as a monochromatic laser beam is projected during a coupling operation.

The optical input coupler comprises a first dielectric input layer 5 disposed on the first surface of the carrier member 3 adjacent an end of the dielectric light guide layer 2 and a second dielectric input layer 6 which is placed on the first layer 5. The first layer 5, which is of a highly refractive material relative to the material of the carrier member 3 for example zinc sulphide which has an index of refraction $n = 2.35$ forms at the interface between the carrier member 3 and the layer 5 a first boundary surface. The second input layer 6 is of a low-refractive material relative to the material of the first input layer and forms a second boundary surface at the interface between layers 5 and 6. For example, the second layer 6 can be of magnesium fluoride which has an index of refraction $n = b\ 1.38$.

The second surface 4 of the carrier member 3 is cut or ground and polished to be inclined at an angle $\alpha$ to the first surface. Angle $\alpha$ in the embodiment illustrated in the FIGURE is equal to 66.9° and is selected so that a laser light beam 1 striking the second surface 4 with an incident angle normal to surface 4 is refracted at the first boundary surface between the layer 5 and the surface of the carrier member 3 to refract the light so that it strikes the second boundary surface between the layers 5 and 6 at the critical angle of total reflection and is reflected in the path or direction 7 into the dielectric light guide layer 2. By the selection of a specific angle $\alpha$ and the choice of the index of refraction of the materials penetrated by the laser beam 1, it is possible to reduce the cross section of the laser beam 1 and match it to the cross section of the light guide 2 so that the beam is injected along a predetermined direction indicated by the path 7. By selecting the thickness of the input layers 5 and 6, the point of entry of the light path 7 into light conductor 2 may also be determined. As illustrated, the layer 5 has a thickness less than the layer 2.

In the case where a slightly diverging light beam 1 is used or a beam of light having a broad frequency band, different angles of refraction and different angles of total reflection will occur. If such light rays are to be coupled in a light conductor 2, care must be taken when determining the parameters for the coupling to ensure that the critical angle of total reflection at the second boundary surface between the layers 5 and 6 is always achieved for each of the beam components striking the second boundary surface. If the critial angle is not achieved, losses will be experienced in the input coupling of the light into the light conducting layer 2.

To increase the input coupling efficiency, the second surface 4 of the carrier member 2 is preferably provided with an anti-reflection coating.

The present invention provides a coupler which will handle monochromatic light and with a proper selection of parameters provides a coupler which will handle with low losses light of a broad frequency band. Furthermore a coupler utilizing the two dielectric layers is very simple to manufacture and has a long operational life.

Although minor modifications might be suggested by those versed in the art, it should be understood that I wish to employ within the scope of the patent granted hereon all such modifications as reasonably and properly come within the scope of my contribution to the art.

I claim:

1. An optical input coupler for introducing light into a light guide comprising a dielectric light guide layer arranged on a first surface of a carrier member of transparent material, the input coupler comprising a first dielectric input layer of highly refractive material relative to the material of the carrier member disposed on the first surface of the carrier member adjacent an end of the dielectric light guide layer to provide a first boundary surface between the first surface of the carrier member and first layer, a second dielectric input layer of low-refractive material relative to the material of the first input layer disposed on the first input layer to provide a second boundary surface between the first and second input layers, and said carrier member having a second surface inclined at an angle to said first surface so that when light is projected on said second surface normal to the second surface, the light is subjected to refraction at the first boundary surface to produce refracted light which strikes the second boundary surface at the critical angle of total reflection and the light is coupled into the dielectric guide layer.

2. An optical input coupler according to claim 1, wherein the second surface of the carrier member is provided with an anti-reflection coating.

3. An optical input coupler according to claim 1, wherein the first input layer consists of zinc sulphide, the second input layer consists of magnesium fluoride, and the light guide layer consists of zinc sulphide.

4. An optical input coupler according to claim 3, wherein said second surface of the carrier member is provided with an anti-reflection coating.

5. An optical input coupler according to claim 1, wherein said first surface is flat and wherein the thickness of the first dielectric input layer is less than the thickness of the dielectric light guide layer.

6. An optical input coupler according to claim 5, wherein said second surface of the carrier member is provided with an anti-reflection coating.

7. An optical input coupler according to claim 5, wherein the first input layer consists of zinc sulphide, the second input layer consists of magnesium fluoride and the light guide layer consists of zinc sulphide.

8. An optical input coupler according to claim 7, wherein said second surface of said carrier member is provided with an anti-reflection coating.

* * * * *